Feb. 24, 1948.  H. ARNEMO  2,436,414
ROTOR FOR ASYNCHRONOUS MACHINES
Filed May 9, 1944
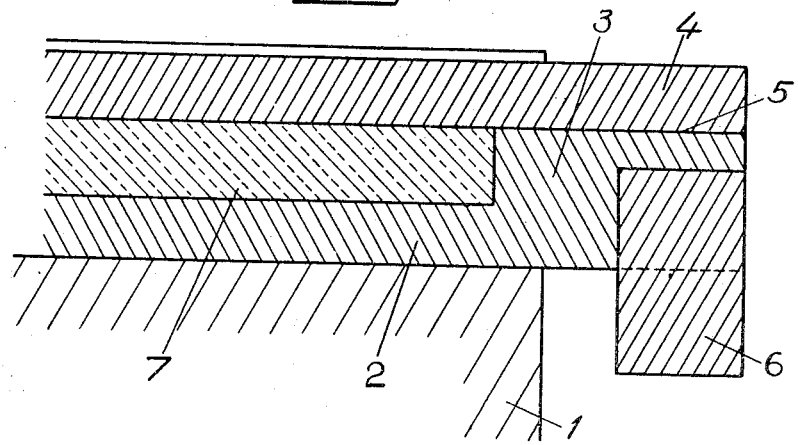
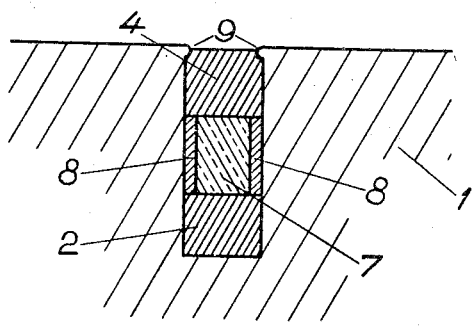
INVENTOR.
Helge Arnemo
BY Wm. Wallace White
Attorney Patented Feb. 24, 1948

2,436,414

UNITED STATES PATENT OFFICE 2,436,414

ROTOR FOR ASYNCHRONOUS MACHINES

Helge Arnemo, Vasteras, Sweden, assignor to Allmänna Svenska Elektriska Aktiebolaget, Vasteras, Sweden, a corporation of Sweden Application May 9, 1944, Serial No. 534,734
In Sweden October 25, 1943

2 Claims. (Cl. 172—120)

This invention relates to an electric slip coupling for use in the propelling and maneuvering of ships and more particularly to the bars of the short-circuit windings of such couplings.

In order to get a high starting torque in asynchronous machines with a short-circuited rotor, when the slip is large, and the rotor frequency thus high, the rotor bars have been made with a large radial extension or the rotor has been provided with two or three windings arranged at different distances from the centre. Both methods have had for their object to achieve an increase of the resistance of the motor at high frequencies by a concentration of the motor current to the part of the winding which is nearer the rotor surface. The use of rotor bars with a large radial extension is, however, combined with the disadvantage of the bars being very high and thin, and the winding therefore mechanically weak and having high losses at normal speed.

In order to improve this construction, it has been proposed on one hand to make a slit in the conductor and on the other hand to insert a magnetic bridge in this slit in order to get a sufficient inductance between the upper and lower part of the conductor.

In order that the resistance of the winding shall not be too large at low frequencies, it is necessary to make it of a material of low specific resistance, and due to this it will have a very low heat capacity, which is a disadvantage for the upper part, which at high frequencies will be traversed by a very large current and thus absorb a great amount of energy.

Another way of getting a different resistance at high and low frequencies is to arrange two windings at different radial depths of the rotor, the conductors being arranged in the same slots but separated by a narrow part of the slot. By varying the width and height of this separating part it is possible to influence the distribution of current in the two windings, and furthermore one has the possibility of giving the outer winding a comparatively good heat capacity.

The disadvantage of a winding designed in the last-mentioned manner is, however, that it can only be used if the active iron of the rotor is built up of iron sheets, which allow the stamping out of the slots with a narrow slit between the upper and lower half of the slot. In a rotor of solid iron, such slots cannot be manufactured without extreme difficulty and expense. In the case of the upper and lower bars being soldered to the same short-circuiting ring, there will furthermore be large heat stresses when the machine is often started or started against heavy loads, which stresses will cause the bars to break.

In certain cases, for instance in electric slip couplings, the rotor is made of solid material, and the bars are inserted in open slots, which are cut in the rotor. In this case, conductors narrow and radially extended may be used but, as mentioned above, this design is combined with the disadvantage that the construction will be very weak and losses during normal operation uneconomically large, and if the conductor is divided, the upper part of the bar will have an insufficient heat capacity. The alternate constrution with two windings arranged at different radial depths cannot obviously be used in slots cut in a solid rotor.

The present invention has for its object a winding for short-circuit asynchronous machines with a solid rotor, which does not possess the above mentioned disadvantages. According to the invention, the conductors of the winding consist of two bars, an inner bar made of a material of a comparatively high conductivity and an outer bar made of a material with high resistance, which two bars are joined at the ends by means of two distance pieces, so that between the bars a slot is attained, which is filled partly with a solid bar of a magnetic material with a smaller width than the width of the slot and partly one or two bands of nonmagnetic material arranged on one or either side of the said magnetic bar. The distance pieces may either be brazed or welded to the bars. But they can also be made in one piece with one of the bars. The joining of the distance pieces and the bars ought to be a separate operation before the bars are brazed to the short-circuiting rings. The axial distance between the inner edges of the distance pieces is chosen so that the edges will fall slightly inside the active iron of the rotor, which in other words means that the distance between the distance pieces will be less than the axial length of the active rotor iron.

The width of the bars is chosen so that the conductors have to be pressed into the slots, the breadth of which is thus entirely filled by the uninsulated bars. They are anchored in the slots by some heavy punchings at certain points of the top edges of the slot. The above-mentioned magnetic bar and also the uninsulated nonmagnetic bands of metal may suitably be made of cold drawn material giving low tolerances, so that these parts need only be cut into required lengths. The magnetic bar and the metal filling bands in combination fill up the entire width of the slot. By the above-mentioned measures an excellent heat contact between all parts of the winding in the slots and the rotor iron is achieved, which has the same effect as if the heat capacity of the rotor bars had been multiplied. Injuries due to heat stresses from local heating of the conductors are thus avoided. They are also counteracted by the fact that at high frequencies the losses are divided between the upper bar and the solid magnetic bridge, which bridge also increases the torque due to eddy currents in it.

On the accompanying drawing, Fig. 1 shows a longitudinal section of one end of a bar according to the invention, and Fig. 2 shows a cross section through the bar in the slot. In the figures, 1 designates the active rotor iron, 2 the lower bar, and 3 one of the distance pieces, which in this case is supposed to be made in the same piece as the lower bar 2. 4 is the upper bar, which is brazed to the distance piece 3 at the surface 5. 6 is the short-circuiting ring, which is brazed to the lower bar, and 7 the magnetic bar inserted in the space between the bars 2 and 4, which bar on both sides is covered with the bands 8 of a nonmagnetic material. The bar is anchored in the slot at the top edges of the same, which at points 9 by punching are partly pressed into the winding.

I claim as my invention:

1. In an electric slip coupling for ship propulsion, a solid iron bar rotor body having bars for the short-circuit winding comprising a lower bar of a material of low specific resistance, an upper bar of a material of high specific resistance spaced from the lower bar, distance pieces joining the adjacent ends of the lower and upper bars to each other and so located that the length of the space between the bars is approximately the same as the axial length of the rotor iron, a bar of a solid magnetic material in said space, and at least one thinner filling band of a metallic nonmagnetic material flanking the bar in said space.

2. In an electric slip coupling for ship propulsion, a solid iron rotor body having bars for the short-circuit winding comprising a lower bar of a material of low specific resistance, an upper bar of a material of high specific resistance spaced from the lower bar, distance pieces integral with one of the bars and connected to the other bar to join the ends of said bars so that the length of the space between the bars and between said distance pieces is substantially equal to the axial length of the rotor iron, a bar of a solid magnetic material in said space and two relatively thin bands of metallic nonmagnetic material one on each side of said bar in said space.

HELGE ARNEMO.

REFERENCES CITED

The following references are of record in the file of this patent:

UNITED STATES PATENTS

| Number | Name | Date |
|---|---|---|
| 677,308 | Eickemeyer | June 25, 1901 |
| 1,495,861 | MacMillan | May 27, 1924 |
| 1,508,152 | Alger | Sept. 9, 1924 |
| 2,259,311 | Kilgore | Oct. 14, 1921 |

FOREIGN PATENTS

| Number | Country | Date |
|---|---|---|
| 234,191 | Great Britain | May 26, 1925 |
| 551,414 | Great Britain | Feb. 22, 1943 |